(12) United States Patent
Fukunaga et al.

(10) Patent No.: US 6,994,902 B2
(45) Date of Patent: Feb. 7, 2006

(54) METALLIC POROUS BODY

(75) Inventors: Hiroshi Fukunaga, Suita (JP);
Mitsuhiro Kishimi, Kyoto (JP); Masao Morishima, Osaka (JP); Toshihiko Yamashita, Osaka (JP)

(73) Assignees: Hitachi Maxell, Ltd., Osaka (JP); Kushibe Manufacturing Co., Ltd., Osaka (JP)

( * ) Notice: Subject to any disclaimer, the term of this patent is extended or adjusted under 35 U.S.C. 154(b) by 148 days.

(21) Appl. No.: 10/736,701

(22) Filed: Dec. 17, 2003

(65) Prior Publication Data

US 2004/0142201 A1     Jul. 22, 2004

(30) Foreign Application Priority Data

Dec. 17, 2002  (JP)  .............................. 2002-364607
Oct. 15, 2003  (JP)  .............................. 2003-355027

(51) Int. Cl.
  *B32B 3/10*   (2006.01)
  *B21C 27/00*  (2006.01)
  *B21D 28/00*  (2006.01)

(52) U.S. Cl. .................... 428/131; 428/134; 428/174; 428/596; 428/604; 428/613

(58) Field of Classification Search ................ 428/131, 428/134, 174, 132, 135, 573, 582, 596, 604, 428/613; 29/6.1, 6.2, 896.6; 72/379.6
See application file for complete search history.

(56) References Cited

U.S. PATENT DOCUMENTS 5,824,435 A     10/1998  Kawano et al.

(Continued)

FOREIGN PATENT DOCUMENTS

EP           0840388 A1    5/1998

(Continued)

OTHER PUBLICATIONS

English language abstract of JP 07335208 (Dec. 22, 1995).

(Continued)

*Primary Examiner*—Donald J. Loney
(74) *Attorney, Agent, or Firm*—Birch, Stewart, Kolasch & Birch, LLP (57) ABSTRACT

A metallic porous body includes a number of protrusions formed on obverse and reverse sides of a metal sheet so as to protrude alternately with one another; each of the protrusions being formed into an truncated-shape wherein an opening portion punched out in the direction from the upper-side bottom to the lower-side bottom is formed in the upper-side bottom of each protrusion, and a vertical distance (d) between the upper-side bottom on the obverse side and the upper-side bottom on the reverse side, and a height (e) of a punched portion have a relation: $0.3 < e/d < 0.9$, thereby attaining a metallic porous body without a burr or a edged convex portion on its outside surface, with a large number of fine pores arranged at fine pitch and a light-weight and robust skeleton.

20 Claims, 9 Drawing Sheets

U.S. PATENT DOCUMENTS

| | | |
|---|---|---|
| 5,902,692 A | 5/1999 | Batawi |
| 6,455,201 B1 | 9/2002 | Sugikawa |
| 6,555,246 B1 * | 4/2003 | Zwick ........................ 428/596 |

FOREIGN PATENT DOCUMENTS

| | | |
|---|---|---|
| EP | 0926752 A1 | 6/1999 |
| EP | 0926752 B1 | 8/2002 |
| EP | 1289034 A1 | 3/2003 |
| JP | 9-7603 A | 1/1997 |
| JP | 9-265991 A | 10/1997 |
| JP | 10-106580 A | 4/1998 |
| WO | WO01/01212 A1 | 1/2001 |
| WO | WO-01/91212 A1 | 11/2001 |

OTHER PUBLICATIONS

English language abstract of JP 20000488223 (Feb. 18, 2000).

* cited by examiner

METALLIC POROUS BODY

This Nonprovisional application claims priority under 35 U.S.C. § 119 (a) on Patent Application No(s). 2002-364607 and 2003-355027 filed in JAPAN on Dec. 17, 2002 and Oct. 15, 2003, the entire contents of which are hereby incorporated by reference.

BACKGROUND OF THE INVENTION

1. Field of the Invention

The present invention relates to a metallic porous body, which is usable as electrodes of electrochemical devices, such as batteries and capacitors, or as various filter materials.

2. Description of the Related Art

In the field of, for example, electric and electrochemical devices, such as capacitors and fuel batteries, two-dimensional or three-dimensional metallic porous bodies are used as electrode base materials. Similar metallic porous bodies are also used as materials of various filters, such as air filters and oil mist filters. Typical examples of such two-dimensional metallic porous bodies are, for example, pore-formed steel sheets, so-called "punching metals", formed by punching metal sheets such as copper foils and steel sheets, and expand metals stretched and formed to a mesh state.

Typical example of three-dimensional metallic porous body includes foamed metals. Generally, the foamed metals are created by the steps of plating a metal such as nickel over urethan foam having lattice-state pores, sintering the plated formation in a reductant ambient, and removing the urethan foam. Fabric metals also can be fabricated in steps similar to the above, in which plating is performed over a non-woven fabric formed by knitting nylon or the like thin fibers.

For use as electrode base materials for electrochemical devices, such as batteries, porous bodies are required to be formed so as to easily extract electricity. Conventionally, three-dimensional metallic porous bodies such as foamed metals are generally used. However, three-dimensional metallic porous bodies are more costly because of using urethane, compared with two-dimensional metallic porous bodies. In addition, processing steps of sintering involves high fabrication costs. Furthermore, the three-dimensional metallic porous bodies require high strength by increasing the sizes of fibers and skeletons, resulting in increasing of weight, reducing in filling amount of active substances, and lowering capacity of batteries.

To solve the problems in a case where a three-dimensional metallic porous body of the type described above is used as an electrode base material, Patent Document 1 (Japanese Unexamined Patent Application Publication JP-9-265991,A (1997)) proposes that a base material with metallic fibers are attached on upper and lower portions of a metal sheet is used for an electric collector. Patent Document 2 (Japanese Unexamined Patent Application Publication JP-10-106580,A (1998)) proposes a manufacturing method in which a metal sheet for a base material is applied with a depressing pressure in an embossing process to provide burrs on individual apexes of concave and convex portions. Patent Document 3 (Japanese Unexamined Patent Application Publication JP-9-7603,A (1997)) proposes usage of a base material formed of a corrugated metal sheet.

However, in the case where a metal sheet is applied with a depressing pressure in an embossing process to form concave and convex portions and in the case where a metal sheet is corrugated, then burrs and sharp convex portions are likely to be formed on the surface of the base material. In addition, in the case of forming edged portions on the surface of the base material, it is difficult to finish the base-material fabrication with one processing step. In other words, the above case requires two or more processing steps of forming concave and convex portions and then forming burrs or corrugating. When machining steps are thus increased, the base material has accumulated strain and hence becomes liable to fracture, consequently leading to deterioration in the production yield. To prevent strain, an additional heat treatment process is required, thereby increasing the fabrication costs. Further, when fabricating a continuous base material, the base material should be wound. However, when the surface of the material has corrugations and/or edged protrusions, the material are likely to be hooked during winding, thereby leading to deterioration in the production yield. Concurrently, care needs to be taken when handling the fabricated base material.

SUMMARY OF THE INVENTION

An object of the present invention is to provide a, metallic porous body that has a three-dimensional structure in a cross-sectional view, that does not have at all a burr or a edged convex portion on its outside surface, that has a large number of fine pores arranged at fine pitch, and that has a light-weight and robust skeleton.

Figure 1:
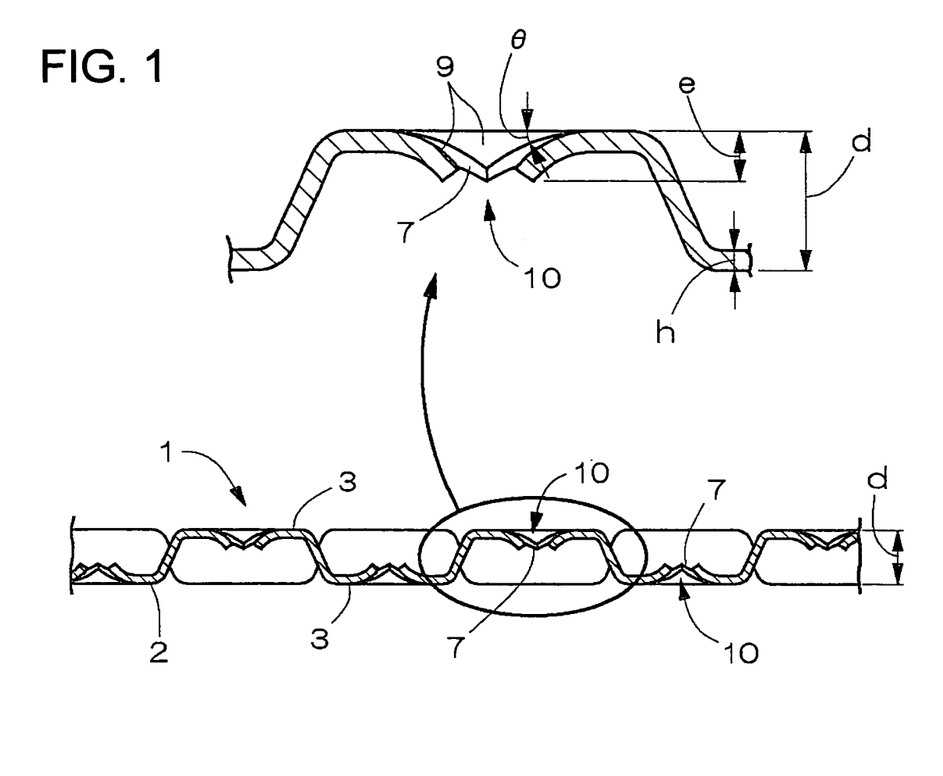
FIG. 1 is a vertical-section side view of a metallic porous body according to the present invention.
Figure 2:
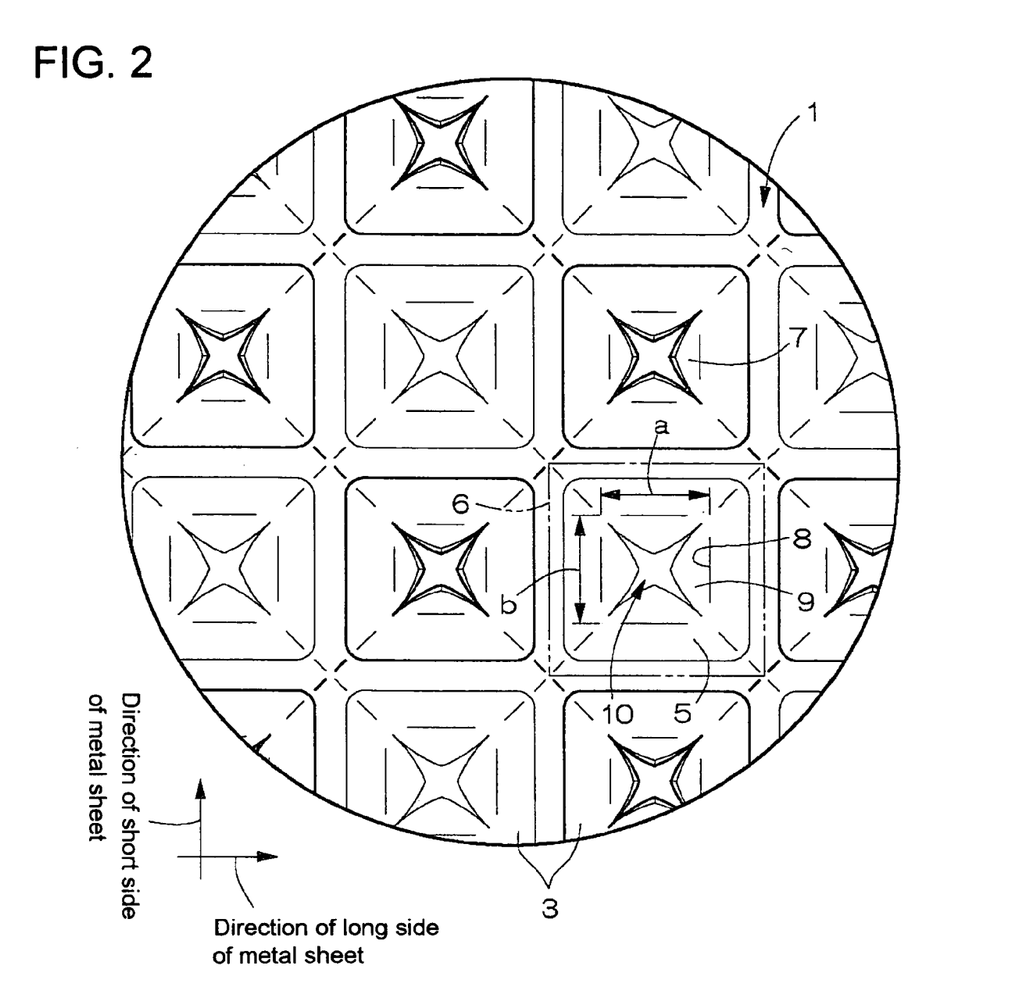
FIG. 2 is an enlarged plan view of a portion of the metallic porous body according to a first embodiment.
Figure 3:
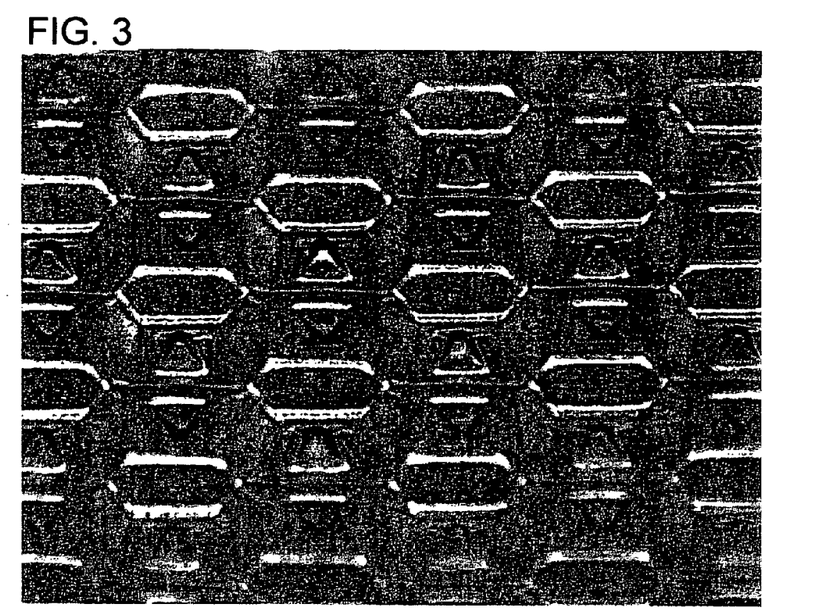
FIG. 3 is a photograph (magnification: 20) taken of a base-material surface in a diagonal direction to show a concave and convex state of a base material fabricated according to the first embodiment.

As shown in FIGS. 1 to 3, the present invention provides a metallic porous body 1 that has a large number of independent opening portions 8 formed by press-forming a planar metal sheet 2. The metallic porous body 1 has a large number of protrusions 3 formed on obverse and reverse sides of the metal sheet 2 in such a manner as to protrude alternately with one another. Each of the protrusions 3 is formed into an angular-truncated-pyramidal shape, wherein an area of an upper-side bottom 5 (protrusion portion) is smaller than an area of lower-side bottom 6. An opening portion 8 having a shape as a polygon in a plan view and punched out in the direction from the upper-side bottom 5 to the lower-side bottom 6 is formed in the upper-side bottom 5 of the each protrusion 3. Where a distance between the upper-side bottom 5 on the obverse side and the upper-side bottom 5 on the reverse side in a vertical direction, that is, a thickness of the metallic porous body 2 is d, and a height of a punched portion is e, $0.3 < e/d < 0.9$ is satisfied. In this case, the "opening portion 8 having a shape as a polygon in a plan view" is a concept including an opening portion having a shape substantially as a polygon with angles partly rounded; that is, the concept includes an opening portion having an overall shape as a polygon.

Figure 4:
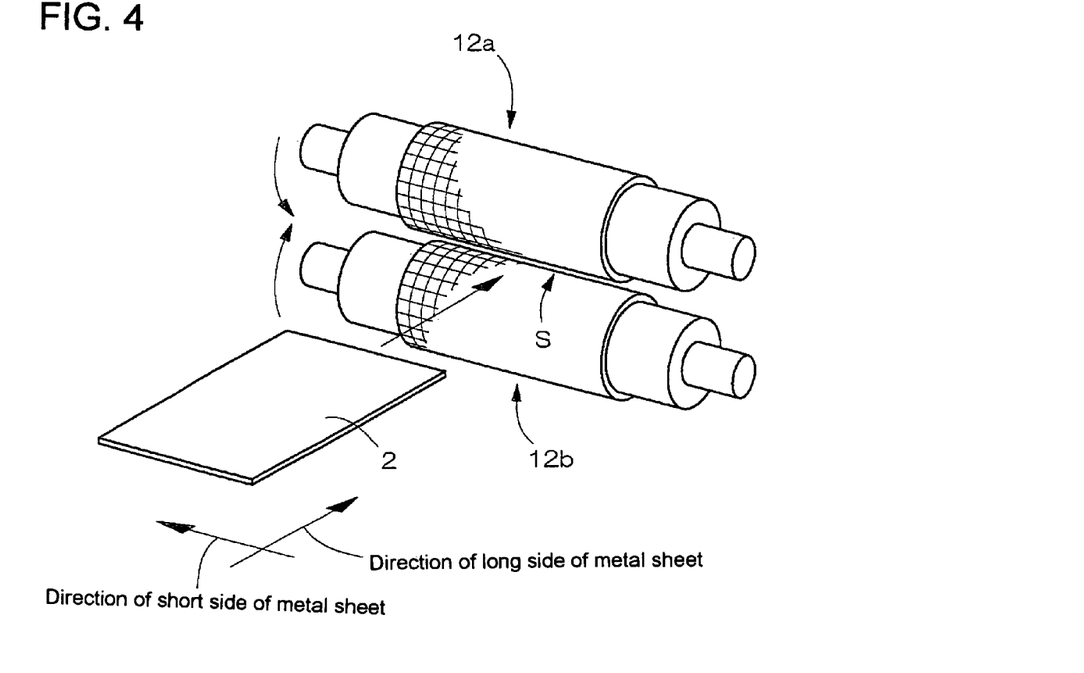
FIG. 4 is a view for explaining a manufacturing method of the metallic porous body according to the present invention.
Figure 7:
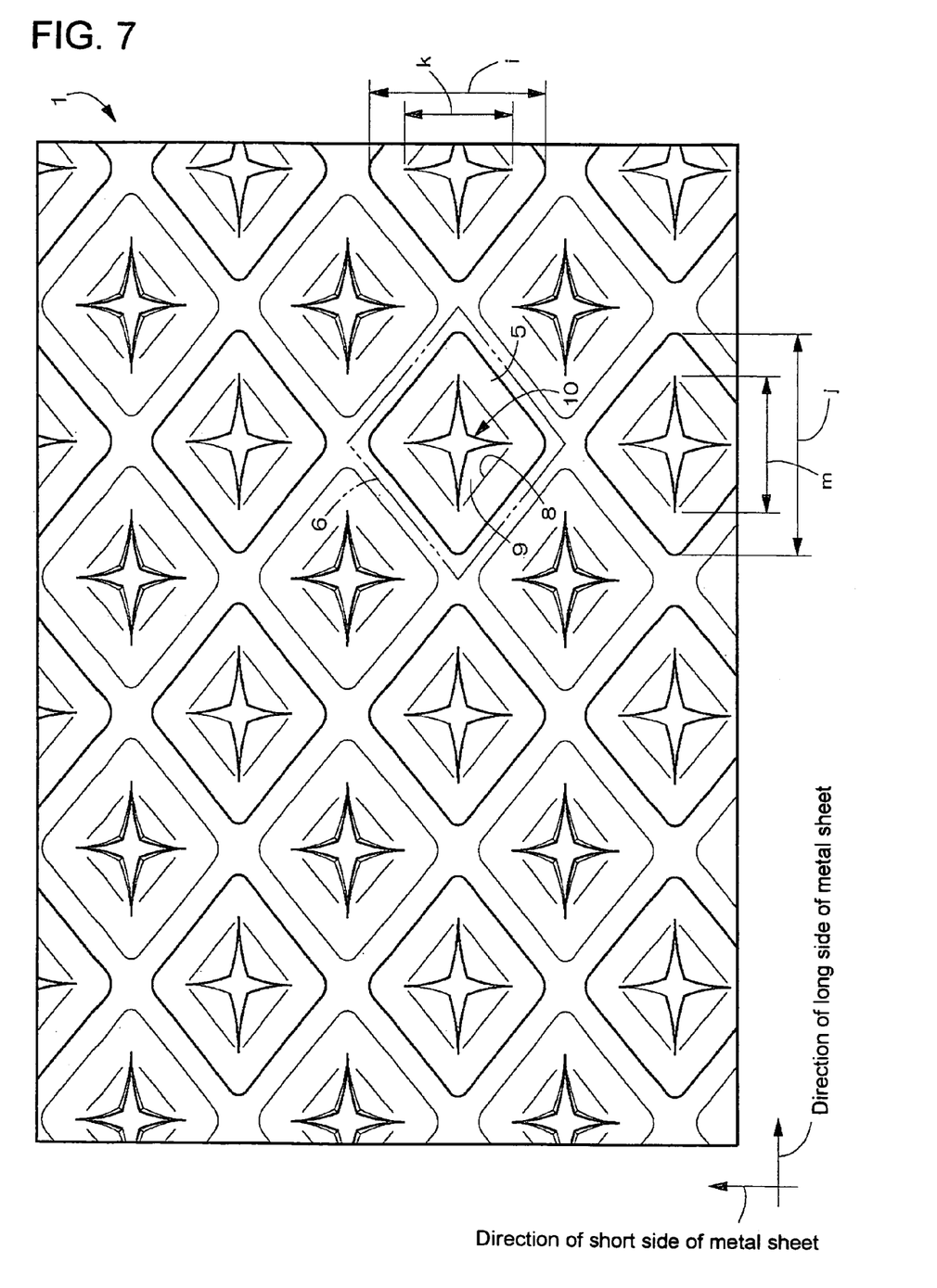
FIG. 7 is an enlarged plan view of a portion of a metallic porous body according to a second embodiment of the present invention.

As shown in FIG. 4, the present invention also provides a metallic porous body 1 that has a large number of independent opening portions 8 formed in a manner that a rectangle-shaped planar metal sheet 2 having short sides and long sides is fed in the direction of the long side to an opposing gap S of a pair of embossing rollers 12a and 12b and is thereby press-formed. As shown in FIGS. 1 and 7, the metallic porous body 1 comprises a large number of protrusions 3 protruding alternately with one another on obverse and reverse sides of the metal sheet 2. Each of the protrusions 3 is formed into a rhombic-truncated-pyramidal shape, wherein an area of an upper-side bottom 5 (protrusion portion) is smaller than an area of lower-side bottom 6. An opening portion 8 having a shape as a rhomboid in a plan view and punched in the direction from the upper-side bottom 5 to the lower-side bottom 6 is formed in the upper-side bottom 5 of the each protrusion 3. The opening portion 8 is formed of a rhombic-pyramidal small concave portion 9, which is concavely formed in a central portion of the upper-side bottom 5, and a cross-throwing-knife shaped opening 10 directed to four corner portions of the upper-side bottom 5 in a central portion of the small concave portion 9, wherein the small concave portion 9 is formed into a petal-like shape downwardly spreading with four petal-shaped pieces. An extension direction of one of two diagonal lines (i and j) individually connecting between mutually opposing apexes of the rhomboid of the protrusion 3 conforms to the direction of the long side of the metallic porous body 1.

Figure 9:
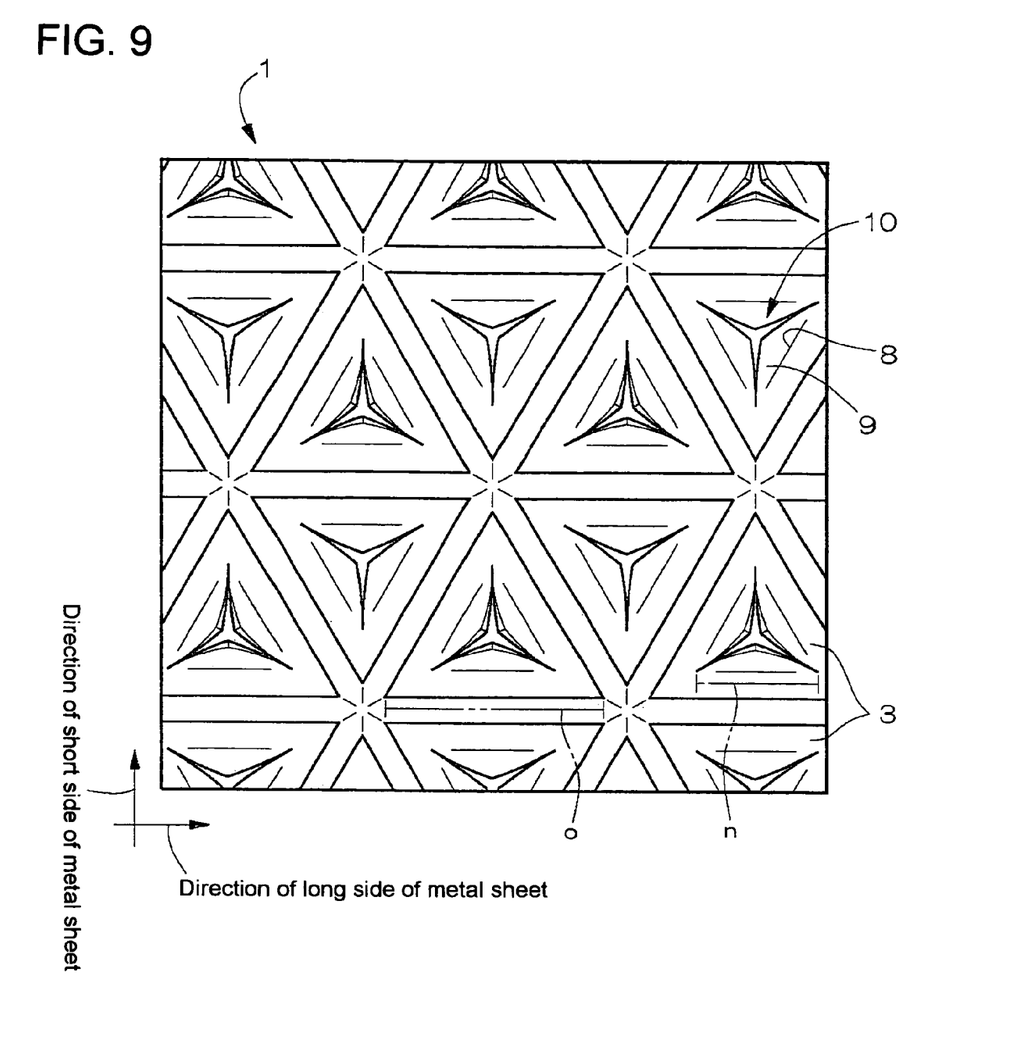
FIG. 9 is an enlarged plan view of a portion of a metallic porous body according to a third embodiment of the present invention.

As shown in FIG. 4, the present invention also provides a metallic porous body 1 having a large number of independent opening portions 8 formed in a manner that a rectangle-shaped planar metal sheet 2 having short sides and long sides is fed in the direction of the long side to an opposing gap S of a pair of embossing rollers 12a and 12b and is thereby press-formed. As shown in FIGS. 1 and 9, the metallic porous body 1 comprises a large number of protrusions 3 protruding alternately with one another on obverse and reverse sides of the metal sheet 2. Each of the protrusions 3 is formed into a triangular-truncated-pyramidal shape, wherein an area of an upper-side bottom 5 (protrusion portion) is smaller than an area of lower-side bottom 6. An opening portion 8 having a shape as a triangle in a plan view and punched in the direction from the upper-side bottom 5 to the lower-side bottom 6 is formed in the upper-side bottom 5 of the each protrusion 3. The opening portion 8 is formed of a triangular-pyramidal small concave portion 9, which is concavely formed in a central portion of the upper-side bottom 5, and a triangular-throwing-knife shaped opening 10 directed to three corner portions of the upper-side bottom 5 in a central portion of the small concave portion 9, wherein the small concave portion 9 is formed into a petal-like shape downwardly spreading with three petal-shaped pieces. An extension direction of one side of the triangle of the protrusion 3 conforms to the direction of the long side (n) of the metallic porous body 1.

Also in each of the patterns shown in FIGS. 7 and 9, where a distance between the upper-side bottom 5 on the obverse side and the upper-side bottom 5 on the reverse side in a vertical direction that is, a thickness of the metallic porous body 2 is d, and a height of a punched petal portion is e, $0.3 < e/d < 0.9$ is preferably satisfied.

Preferably, a thickness h of the metal sheet 2 before processing is 10 to 50 $\mu$m. A thickness d of the metallic porous body 1 including the protrusions 3 is preferably ranged from 0.06 to 1.2 mm. The metal sheet 2 preferably has a unit weight ranged from 50 to 450 g/m$^2$. As shown in FIG. 1, an angle $\theta$ between a portion punched downwardly of the protrusion 3 and a flat portion of the upper-side bottom is preferably greater than 0° and smaller than 90°.

Figure 5A:
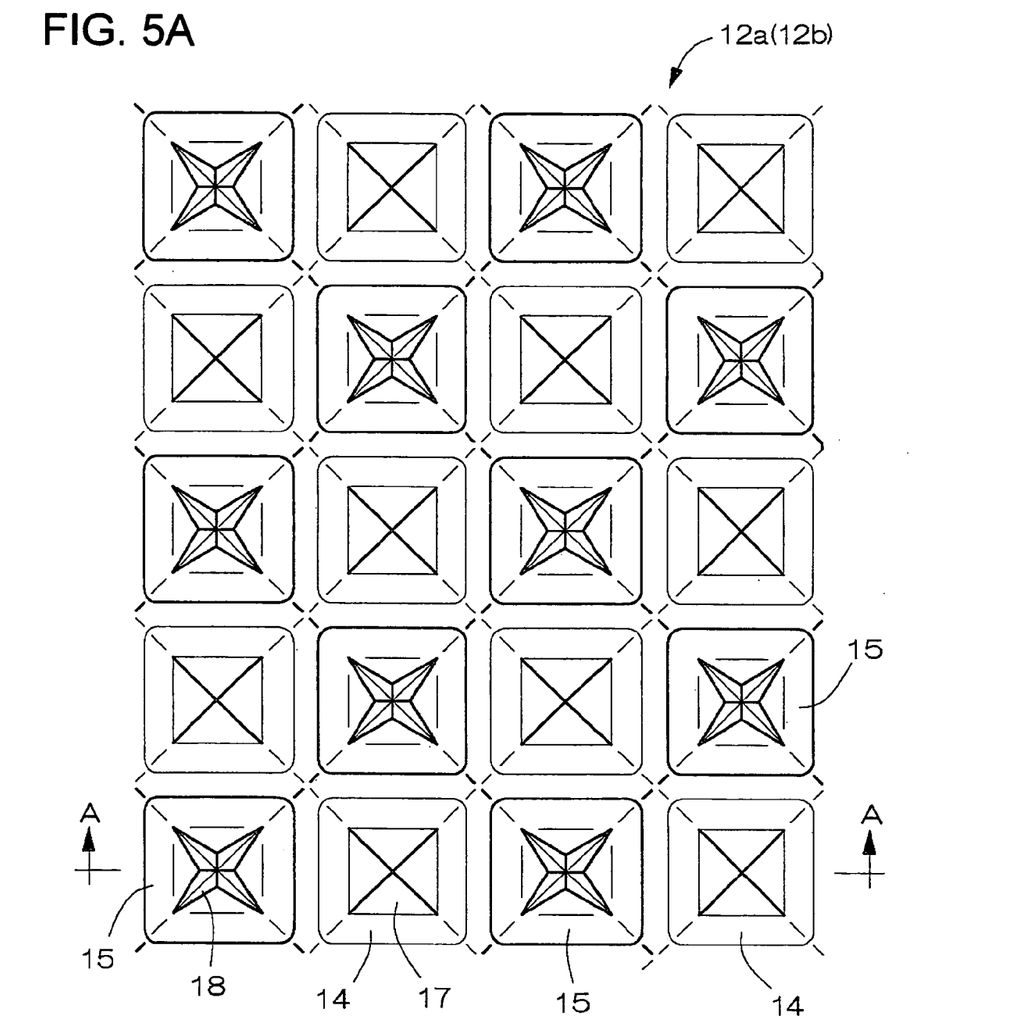
FIG. 5A is an enlarged plan view of a portion of embossing rollers.
Figure 5B:
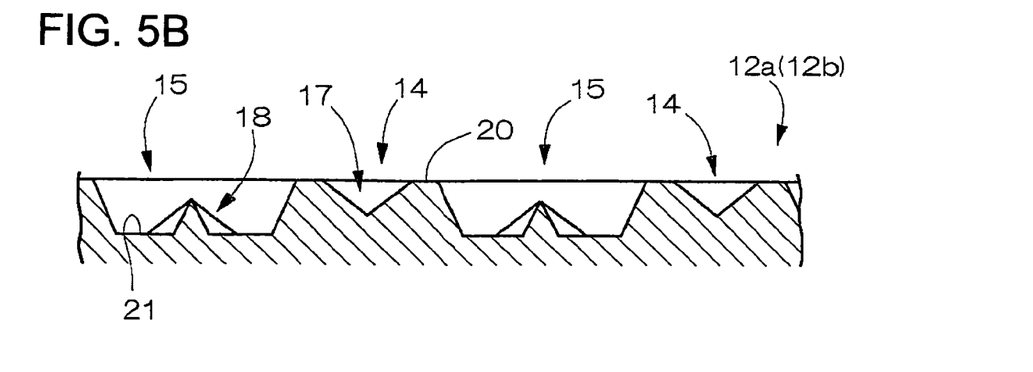
FIG. 5B is a sectional view along the line A—A of FIG. 5A.
Figure 6:
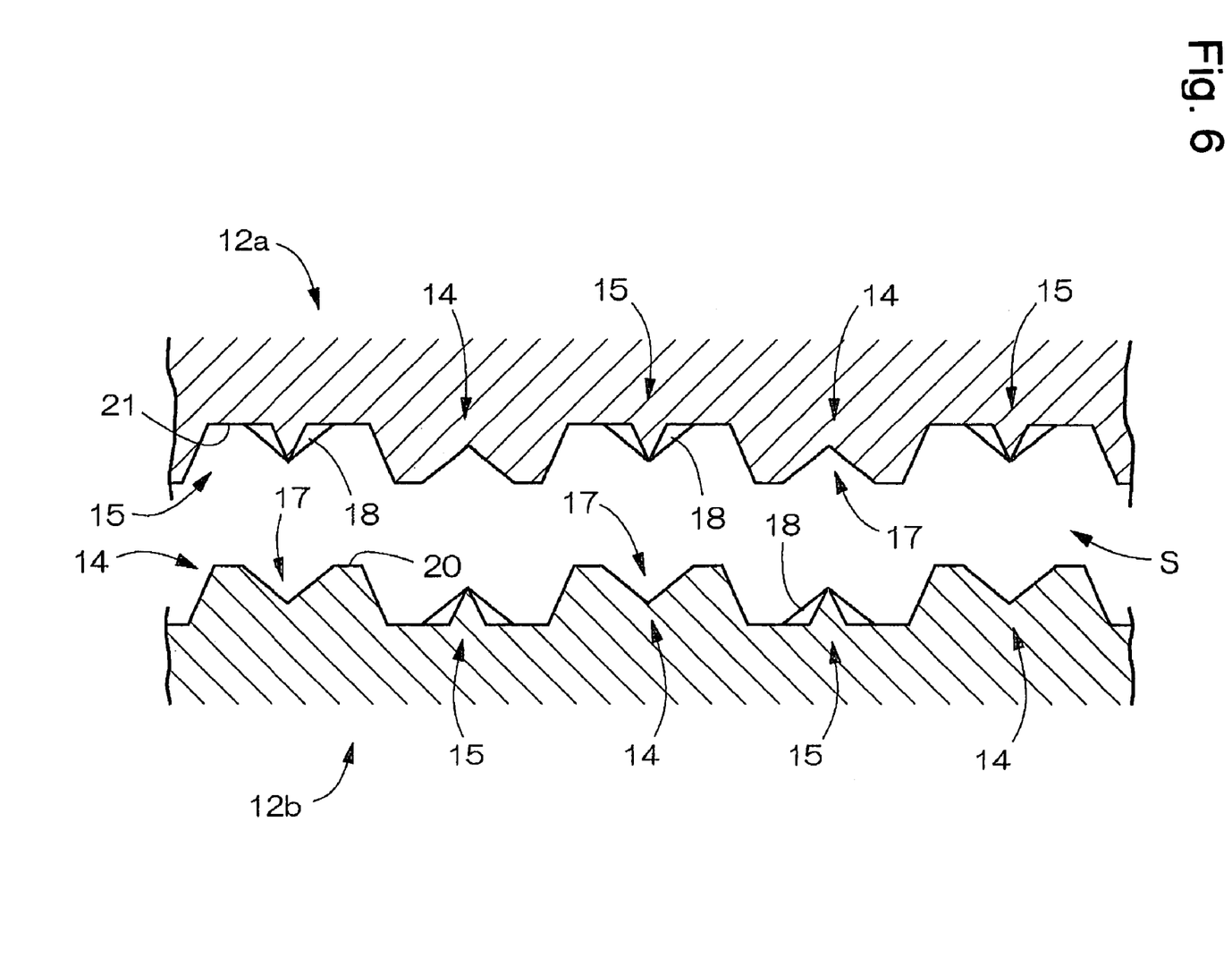
FIG. 6 is an enlarged sectional view showing an opposing portion of a pair of the embossing rollers.

In the manufacture of a metallic porous body 1, as a pair of embossing rollers 12a and 12b for press-forming a metal sheet 2, as shown in FIGS. 4, 5A and 5B, rollers 12a and 12b having a special structure, are used. On the surface of each of the embossing rollers 12a and 12b, large numbers of angular-truncated-pyramidal convex and concave portions 14 and 15 are provided alternately with one another in the longitudinal and lateral directions in a matrix. A polygonal-pyramidal fine concave portion 17 is concavely formed in a central portion of the convex portion 14. In a central portion of the concave portion 15, there is formed a multidirectional cross-throwing-knife shaped fine convex portion 18 having a plurality of apexes formed toward to corner portions of the concave portion 15 in a plan view. A ridge portion connecting between each of the apexes and a protrusion apex portion in the center is formed in the form of a cutting edge. As shown in FIG. 6, the convex and concave portions 14 and 15 and fine concave and convex portions 17 and 18 of the two embossing rollers 12a and 12b are provided to be alternate with one another. These embossing rollers 12a and 12b are rotated in the directions opposite to each other in the state where the convex and concave portions 14 and 15 engage the fine concave and convex portions 17 and 18.

As shown in FIG. 4, by feeding the metal sheet 2 into the opposing gap S of the embossing rollers 12a and 12b, embossing process is performed to form the angular-truncated-pyramidal protrusions 3 through the upper and lower convex and concave portions 14 and 15 to alternately protrude on the obverse and reverse surfaces of the metal sheet 2. Concurrently, the upper-side bottom 5 of the each protrusion 3 is pierced through by the fine convex portion 18, and the polygonal-pyramidal opening portion 8 punched in the direction from the upper-side bottom 5 to the lower-side bottom 6 is formed.

Figure 8A:
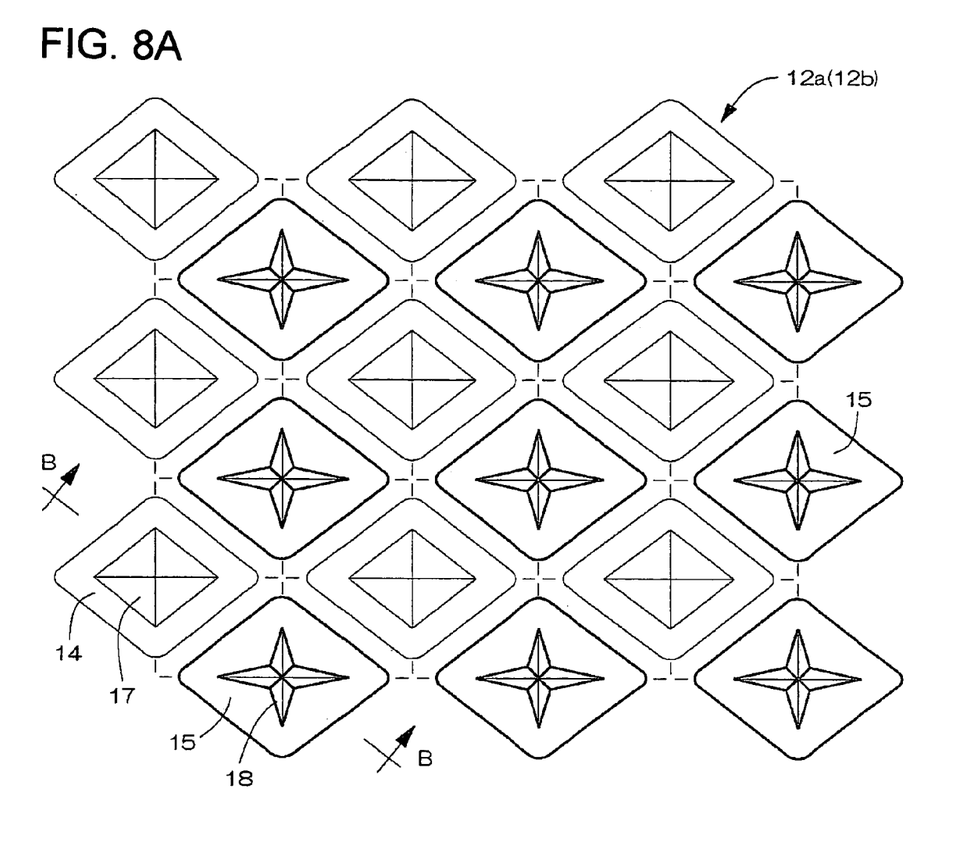
Figure 8B:
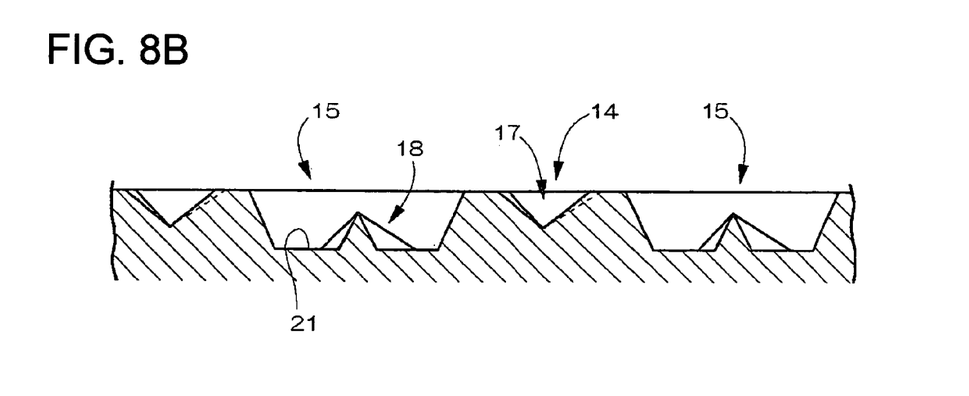
FIG. 8B is a sectional view along the line B—B of FIG. 8A.

In more detail, as shown in FIG. 4, the metal body 2 has a rectangle shape having short sides and long sides and is fed in the direction of the long side to the opposing gap of the embossing rollers 12a and 12b. As shown in FIGS. 8A and 8B, convex and concave portions 14 and 15 formed on the surfaces of the embossing rollers 12a and 12b are each formed into the rhombic-truncated-pyramidal shape. A rhombic-pyramidal fine concave portion 17 is concavely formed in a central portion of the convex portion 14. In a central portion of the each concave portion 15, there is convexly formed a fine convex portion 18 that has a shape as a cross-throwing-knife (four-directional-throwing- knife) with four apexes formed toward corner portions of the concave portion 15 in a plan view. The convex and concave portions 14 and 15 are each formed such that an extension direction of one of two diagonal lines individually connecting between the mutually opposing apexes of the rhomboid of each of the convex and concave portions 14 and 15 conforms to the direction of the long side of the metal sheet 2, that is, the direction of feeding the metal sheet 2 to the embossing rollers 12a and 12b.

Then, as shown in FIG. 4, when the metal sheet 2 is fed to an opposing gap S of the embossing rollers 12a and 12b, as shown in FIG. 7, rhombic-truncated-pyramidal protrusions 3 protruding alternately with one another on the obverse and reverse surfaces of the metal sheet 2 are each formed with a posture as that an extension direction of one of two diagonal lines (i and j) individually connecting between mutually opposing apexes of the rhomboid of the protrusion 3 conforms to the direction of the long side of the metal body 2.

Figure 10A:
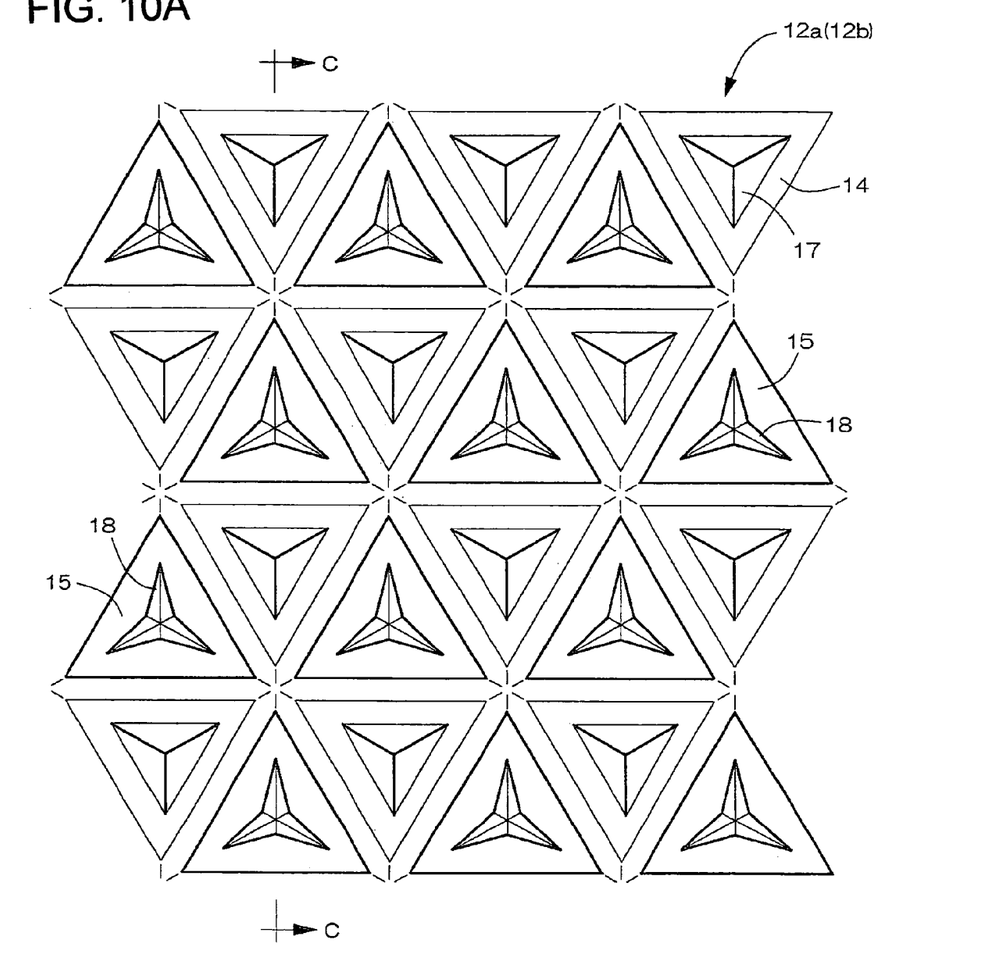
FIG. 10A is an enlarged plan view of a portion of embossing rollers.
Figure 10B:
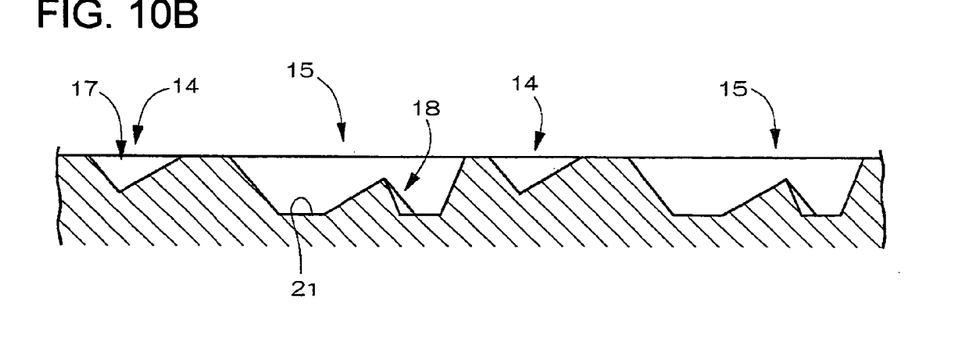
FIG. 10B is a sectional view along the line C—C of FIG. 10A.

In addition, as shown in FIG. 4, the arrangement may be such that a metal body 2 has a rectangular shape having short sides and long sides and is fed in the direction of the long side to an opposing gap S of a pair of embossing rollers 12a and 12b; and then, as shown in FIGS. 10A and 10B, convex and concave portions 14 and 15 formed on the surfaces of the embossing rollers 12a and 12b are each formed into the triangular-truncated-pyramidal shape. In this case, in a central portion of the each convex portion 14, a triangular-pyramidal fine concave portion 15 is formed in a central portion of the each convex portion 14. In a central portion of the concave portion 15, there is formed a tri-directional throwing-knife shaped fine convex portion 18 having three apexes formed toward corner portions of the concave portion 15 in a plan view. The convex and concave portions 14 and 15 are each formed such that one of extension directions of one side of the triangle of each of the convex and concave portions 14 and 15 conforms to the direction of the long side of the metal sheet 2, that is, the direction of feeding the metal sheet 2 to the embossing rollers 12a and 12b.

When the metal sheet 2 is fed to an opposing gap S of the embossing rollers 12a and 12b, triangular-truncated-pyramidal protrusions 3 protruding alternately with one another on the obverse and reverse surfaces of the metal sheet 2 are each formed with such a posture as that an extension direction of one side (n) of the triangle of the triangular-truncated-pyramidal protrusion 3 conforms to the direction of the long side of the metal body 2.

In respect of advantageous effects, as shown in FIG. 1, in the metallic porous body of the present invention, the embossing process is performed on the obverse and reverse surfaces thereof so that the protrusions 3 are formed opposite to one another, and the opening portions 8 are individually provided in the central portions of the protrusions 3, the metallic porous body 1 has a high space ratio. As such, when the metallic porous body 1 is used as an electrode base material, much active-substance containing paste can be applied to contribute to battery capacity enhancement. In addition, the active-substance utilization ratio can be improved, and hence electric collection capacity can be improved.

As shown in FIG. 2, the upper-side bottom 5 (protrusion portion, i.e., the convex end face of the protrusion) of the rectangular-truncated-pyramidal protrusion 3 is formed into the angular-truncated-pyramidal shape to have the area smaller than that of the lower-side bottom 6. Thereby, a mixture-containing paste (which hereinafter will shortly be referred to as "paste") is facilitated to enter the protrusion 3, so that a paste-filling rate can be improved. By forming the upper-surface opening portion 8 to be provided in the protrusion 3 to be a polygonal pore (for example, the upper-surface opening portion 8 is formed as a rectangle-shaped pore), the upper-surface opening portion 8 can be widely formed, and hence the amount and efficiency of filling can be improved.

By punch-forming the punched burr 7 from the upper-side bottom 5 toward the lower-side bottom 6, a sharp metal convex portion can be prevented from being formed on the surface of the metallic porous body 1, consequently enabling prevention of such problems of causing fracture of the metallic porous body 1 because of being caught by a doctor blade in the course of continuous coating of the active-substance containing paste and/or of disabling uniform coating. In addition, e/d should be set to 0.3 to 0.9 because of the relationship between the thickness (d) of the base material 1 and the height (e) of the punched portion. Unless otherwise the ratio is thus set, the end of the punched burr 7 formed in the direction from the upper-side bottom 5 of the protrusion 3 to the lower-side bottom 6 thereof may probably be formed to unexpectedly over-extend from the outermost surface of the lower-side bottom 6, depending on the forming angle, length, and the like factor. When e/d is 0.3 or lower, the distance from the active substance is increased, thereby resulting in reduction of electric collection efficiency. When e/d is higher than 0.9, a case can occur in which the punched burr 7 is caught during handling, thereby potentially leading to reduction in work efficiency and hence deteriorating the production yield.

The thickness of the metal sheet 2 constituting the metallic porous body 1 is preferably ranged from 10 to 50 $\mu$m. With a thickness smaller than 10 $\mu$m, the strength of the metallic porous body 1 after processing is low, thereby disabling a robust skeletal formation to be obtained. With a thickness larger than 50 $\mu$m, the volume of the metal portion taking place in the metallic porous body 1 after formation is large, so that the fill factor of the active substance is reduced, thereby inducing battery-capacity reduction.

The thickness (d) of the metallic porous body 1 including the rectangular-truncated-pyramidal protrusions 3 is preferably in the range of from 0.06 to 1.2 mm. With a thickness smaller than 0.06 mm, a sufficient amount of the active substance cannot be filled since processing steps using a press, a calendar, or the like after the active substance has been filled. With a thickness larger than 1.2 mm, the distance between the active substance and the metal sheet 2 is increased, so that the active-substance utilization ratio is reduced, and hence the battery capacity is reduced.

The weight of the metal sheet 2 is determined to be 50 to 450 g/m$^2$. With a weight less than 50 g/m$^2$, a sufficient strength required for a battery electrode cannot be maintained. With a weight greater than 450 g/m$^2$, the weight of the metal portion taking place after formation, the fill amount of the active substance is reduced. In this view, the weight of the metal sheet 2 is determined to be 50 to 450 g/m$^2$, more preferably 75 to 425 g/m$^2$.

An angle $\theta$ between a portion punched downwardly of the protrusion 3 and a flat portion of the upper-side bottom 5 is preferably greater than 0° and smaller than 90°. The angle 0° means that the opening portion 8 is not punched. With the angle $\theta$ being set to 20°, the porosity can be increased, efficiency of filling the active-substance can be improved, and the active-substance utilization ratio can be improved, the metallic porous body 1 becomes feasible as electrode base materials of electrochemical devices, such as batteries and capacitors and the like. With the angle being set larger than 90°, it makes it difficult to perform the forming process itself for the metallic porous body 1, or increased labor costs are required, consequently leading to increased fabrication costs. In addition, the utilization ratio of the active substance filled into the central portion of the punched portion is reduced, so that the metallic porous body 1 becomes unsuitable as electrode base materials of electrochemical devices.

As shown in FIG. 7, in the case where the each protrusion 3 is formed into the rhombic-truncated-pyramidal shape, when the extension direction (the extension direction of the diagonal line j, in FIG. 7) of one of the two diagonal lines (i and j) individually connecting between the mutually opposing apexes of the protrusion 3 conforms to the direction of the long side of the metal sheet 2 (metallic porous body 1), that is, the direction of feeding the metal body 2, which is the base material, to the opposing gap S between the embossing rollers 12a and 12b, the extension directions of the individual sides constituting the rhomboid-shaped protrusion 3 is caused not to conform to the direction of feeding the metal body 2 to the embossing rollers 12a and 12b. For this reason, compared with the case in which, as shown in FIG. 2, the extension directions of the individual sides constituting the rectangle-shaped protrusion 3 conform to the direction of feeding the metal body 2 to the embossing rollers 12a and 12b, a force exerting on the metal sheet 2 during the press forming to elongate the metal sheet 2 to the direction of the long side thereof is dispersed, thereby enabling the force to be reduced as low as possible. Consequently, the metal sheet 2 can be prevented from being unintentionally elongated in the direction of the long side, and hence the metallic porous body 1 can be fabricated with high dimensional accuracy. Concurrently, for example, the metallic porous body 1 can be effectively prevented from wrinkling, and the metallic porous body 1 can be effectively prevented from being cleaved because of the opening portions 8 being enlarged.

As shown in FIG. 9, in the case where the each protrusion 3 is formed triangular-truncated-pyramidal, the extension direction of one side (the extension direction of a side n, in FIG. 9) of the triangle of the protrusion 3 conforms to the direction of the long side of the metal sheet 2 (metallic porous body 1), that is, the direction of feeding the metal body 2, which is the base material, to the opposing gap S between embossing rollers 12a and 12b. Accordingly, similar to the FIG. 7 case according to the above-described second embodiment, a force exerting on the metal sheet 2 during the press forming to elongate the metal sheet 2 to the direction of the long side thereof is dispersed, so that the force can be reduced as low as possible. Consequently, the metal sheet 2 can be prevented from being unintentionally elongated in the direction of the long side, and hence the metallic porous body 1 can be fabricated-with high dimensional accuracy. Concurrently, for example, the metallic porous body 1 can be effectively prevented from wrinkling, and the metallic porous body 1 can be effectively prevented from being cleaved because of the opening portions 8 being enlarged.

BRIEF DESCRIPTION OF THE DRAWINGS

FIG. 8 A is an enlarged plan view of a portion of embossing rollers.

DETAILED DESCRIPTION OF THE PREFERRED EMBODIMENTS

This application is based on two applications No. 2002-364607 filed Dec. 17, 2002 in Japan and No. 2003-355027 filed Oct. 15, 2003 in Japan, each disclosure of which is incorporated herein by reference.

Hereinafter, preferred embodiments will be described with reference to drawings.

(First Embodiment)

FIGS. 1 to 3 show a first embodiment in which a metallic porous body of the present invention is adapted to electrode base materials for various electrochemical devices such as batteries. As shown in FIGS. 1 and 2, a metallic porous body 1 is fabricated by press-forming a metal sheet 2 made of an original material, such as iron, stainless steel, nickel, copper, or aluminium. On obverse and reverse sides of the metal 2, a large number of rectangular-truncated-pyramidal protrusions 3 are formed in such a manner as to alternately protrude. In the present case, an SPCC steel sheet having a thickness (h) of 25 $\mu$m is used, wherein the rectangular-truncated-pyramidal protrusions 3 each formed of an upper-side bottom 5 and a lower-side bottom 6 are formed in a matrix on both obverse and reverse surfaces of the steel sheet. The protrusions 3 are each formed into a square-truncated-pyramidal shape so that the area of an upper-side bottom 5 (protrusion portion) is smaller than that of a lower-side bottom 6, wherein the longitudinal and lateral lengths of the lower-side bottom 6 are 1.13 mm and the longitudinal and lateral lengths (a and b) of the upper-side bottom 5 are 0.65 mm (a=b=0.65 mm).

On the upper-side bottom 5 of the each protrusion 3, a rectangle-shaped pore 8 (opening portion) having a punched burr 7 toward the lower-side bottom 6 and having an upper-side opening portion of which the shape is square. In more detail, the opening portion 8 is formed of a small concave portion 9, which is concavely formed in a central portion of the upper-side bottom 5, and a cross-throwing-knife shaped (sharp-cross shaped) opening 10 punched toward the lower-side bottom 6 in a central portion of the small concave portion 9. The small concave portion 9 is formed into a petal-like shape spreading with four petal-shaped pieces. In this embodiment, the longitudinal and lateral size of the opening portion 8, that is, the longitudinal and lateral size of the small concave portion 9 is 0.65×0.65 mm.

As shown in FIG. 1, in the present case, a thickness d of the base material 1 inclusive of the protrusion 3 with the obverse and reverse surfaces is 0.44 mm. A height e of a punched portion, which is defined by a flat portion of the upper-side bottom 5 and a lower end portion of the burr 7, is 0.24 mm, and e/d is 0.55. The weight of the metal sheet 2 after formation of the protrusions 3 is 215 g/m$^2$.

As shown in FIG. 4, the base material 1 having the three-dimensional body described above can be fabricated by feeding the metal sheet 2 to pass through an opposing gap S between a pair of upper and lower embossing rollers 12a and 12b that rotate in directions opposite to each other. In this case, as shown in FIGS. 5A and 5B, on the surface of each of the embossing rollers 12a and 12b, large numbers of convex portions 14 and concave portions 15 are formed alternately with one another in the longitudinal and lateral directions in a matrix. Each of the convex portions 14 is convexly formed into a rectangular-truncated-pyramidal so as to downwardly spread; and a rectangular-pyramidal fine concave portion 17 is concavely formed in a central portion of a convex portion 20 of the convex portion 14. Each of the concave portions 15 is concavely formed into the rectangular-truncated-pyramidal shape to upwardly spread; and in a central portion of a cave-in portion 21 thereof, there is formed a cross-throwing-knife shaped fine convex portion 18 having four apexes formed toward corner portions of the concave portion 15 in a plan view. A ridge portion connecting between each of the apexes of the fine convex portion 8 and a protrusion apex portion in the center is formed in the form of a cutting edge. The convex and concave portions 14 and 15 are each formed into a square having a longitudinal and lateral size of 1.13 mm×1.13 mm in a plan view. The fine concave and convex portions 17 and 18 are each formed into a square having a size of 0.65 mm×0.65 mm. In the present case, the height of the convex portion 14 and the depth of the concave portion 15 are each 0.4 mm, and the height of the fine convex portion 18 and the depth of the fine concave portion 17 are each 0.35 mm.

As shown in FIG. 6, the concave and convex portions 14 and 15 and fine convex and concave portions 17 and 18 of the upper and lower embossing rollers 12a and 12b are provided to be alternate with one another. In more specific, the concave portion 15 of the lower roller 12b is positioned in a position matching the convex portion 14 of the upper roller 12a; and likewise, the fine concave portion 17 of the lower roller 12b is positioned in a position matching the fine convex portion 18 of the upper roller 12a. Thus, the opposing gap S between the upper and lower embossing rollers 12a and 12b is provided to have a wavy teeth profile in which the upper and lower convex and concave portions 14 and 15 can be engaged with the fine concave and convex portions 17 and 18.

As shown in FIG. 4, when the metal sheet 2 is fed into the opposing gap S of the pair of upper and lower embossing rollers 12a and 12b, embossing process is performed to form the individual rectangular-truncated-pyramidal protrusions 3 through the upper and lower convex and concave portions 14 and 15 to alternately protrude on the obverse and reverse surfaces of the metal sheet 2. Concurrently, the rectangular-truncated-pyramidal small concave portion 9 is formed in the each protrusion 3; and a central portion of the small concave portion 9 is pierced through by the fine convex portion 18, and the cross-throwing-knife shaped opening 10 is thereby formed. The small concave portion 9 is formed into a petal-like shape spreading with four petal-shaped burrs.

To show the concave and convex state of the surface of the base material 1 obtained in the manner described above, FIG. 3 is a photograph (magnification: 20) of the surface of the base material 1, which photograph was taken in a diagonal direction. Referring to the photograph, the base material 1 is shown having eight multiply provided opening portions 8 (opening portions) are arranged in a matrix at fine pitch. In this case, it could be verified that a burr, sharp convex portion, or the like does not present at all over the surface. Meanwhile, FIGS. 1 and 2 schematically show the states where the protrusions 3 are formed over the both obverse and reverse surfaces of the metal sheet 2 (SPCC steel sheet), in which the dimensions of individual portions are not accurately shown.

As described above, in the base material 1, which is the metallic porous body, according to the present embodiment, the embossing process is performed on the obverse and reverse surfaces thereof so that the protrusions 3 are formed opposite to one another, and the opening portions 8 are individually provided in the central portions of the protrusions 3, so that when the metal sheet 2 has a thickness of, for example, 25 $\mu$m, the sectional formation thereof can be formed into a three-dimensional structure up to a thickness of about 440 $\mu$m (d: refer to FIG. 1). This enables obtaining the base material 1 having a high space ratio, so that the battery capacity can be increased by coating much active-substance containing paste. In addition, the active-substance utilization ratio can be improved, and hence electric collection capacity can be improved. The upper-side bottom 5 (protrusion portion, i.e., the convex end face of the protrusion) of the rectangular-truncated-pyramidal protrusion 3 is formed into an angular-truncated-pyramidal to have the area smaller than that of the lower-side bottom 6. Thereby, a mixture-containing paste (which hereinafter will shortly be referred to as "paste") is facilitated to enter the protrusion 3, so that a paste-filling rate can be improved. The angular-truncated-pyramidal protrusions 3 adjacent one another are protruded opposite one another with respect to the obverse and reverse sides and are formed symmetric with respect to the obverse and reverse sides. Thereby, the paste-coating amount can be uniformly provided, so that possible warpage of electrodes in the press-forming step at the time of electrode formation can be suppressed, consequently enabling the productivity to be improved. By forming the upper-surface opening portion 8 to be provided in the protrusion 3 to be a polygonal pore (for example, the upper-surface opening portion 8 is formed as a rectangle-shaped pore), the upper-surface opening portion 8 can be widely formed, and hence the amount and efficiency of filling can be improved.

In addition to the above, by punch-forming the punched burr 7 from the upper-side bottom 5 toward the lower-side bottom 6, a sharp metal convex portion can be prevented from being formed on the surface of the base material 1, consequently enabling prevention of such problems of causing fracture of the base material 1 because of being hooked by a doctor blade in the course of continuous coating of the active-substance containing paste and/or of disabling uniform coating. Further, an advantage can be obtained in that shorting can be prevented since such a case can be avoided in which the base material 1 is exposed as well to a post-formation electrode surface. In this case, e/d should be set to 0.3 to 0.9 because of the relationship between the thickness (d) of the base material 1 and the height (e) of the punched portion. Unless otherwise the ratio is thus set, the end of the punched burr 7 formed in the direction from the upper-side bottom 5 of the protrusion 3 to the lower-side bottom 6 thereof may probably be formed to unexpectedly over-extend from the outermost surface of the lower-side bottom 6, depending on the forming angle, length, and the like factor. In addition, when e/d is 0.3 or lower, the distance from the active substance is increased, thereby resulting in reduction of electric collection efficiency. When e/d is higher than 0.9, a case can occur in which the punched burr 7 is caught during handling, thereby potentially leading to reduction in work efficiency and hence deteriorating the production yield. In view of the above, e/d is preferably in the range of from 0.3 to 0.9, and more preferably in the range of from 0.4 to 0.8.

The thickness of the metal sheet 2 is preferably ranged from 10 to 50 $\mu$m. With a thickness smaller than 10 $\mu$m, the strength of the base material 1 after processing is low, thereby disabling a robust skeletal formation to be obtained. With a thickness larger than 50 $\mu$m, the volume of the metal portion taking place in the base material 1 after formation is large, so that the fill factor of the active substance is reduced, thereby inducing battery-capacity reduction.

The thickness (d) of the base material 1 including the rectangular-truncated-pyramidal protrusions 3 is preferably in the range of from 0.06 to 1.2 mm. With a thickness smaller than 0.06 mm, a sufficient amount of the active substance cannot be filled since processing steps using a press, a calendar, or the like after the active substance has been filled. With a thickness larger than 1.2 mm, the distance between the active substance and the metal sheet is increased, so that the active-substance utilization ratio is reduced, and hence the battery capacity is reduced.

The weight of the metal sheet 2 is determined to be 50 to 450 g/m². With a weight less than 50 g/m², a sufficient strength required for a battery electrode cannot be maintained. With a weight greater than 450 g/m², the weight of the metal portion taking place after formation, the fill amount of the active substance is reduced. In this view, the weight of the metal sheet 2 is determined to be 50 to 450 g/m², more preferably 75 to 425 g/m².

In the manner of using the above-described specially shaped embossing rollers 12a and 12b to fabricate the base material 1, the lengthy base material 1 can be fabricated with one machining step, so that fabrication costs can be reduced. Notwithstanding that the section is the three-dimensional formation, since neither burr nor sharp convex portion occurs, winding is easy, and the base material 1 can be produced with a high production yield. Since one push-in forming step can accomplish the fabrication, strains do not easily occur; therefore, the obtained base material 1 has a robust skeleton and a high tensile strength.

(Second Embodiment)

FIG. 7 shows a metallic porous body according to a second embodiment. As shown in FIGS. 1 and 7, a metallic porous body 1 is fabricated by press-forming a metal sheet 2 made of an original material, such as iron, stainless steel, nickel, copper, or aluminium. On obverse and reverse sides of the metal 2, a large number of rhombic-truncated-pyramidal protrusions 3 are formed in such a manner as to alternately protrude in a matrix. In the present case, as shown in FIG. 1, the SPCC steel sheet having the thickness (h) of 25 $\mu$m is used, wherein the rhombic-truncated-pyramidal protrusions 3 each formed of an upper-side bottom 5 and a lower-side bottom 6 are formed in a matrix on both obverse and reverse surfaces of the steel sheet. The protrusions 3 are each formed into the rhombic-truncated-pyramidal shape so that the area of an upper-side bottom 5 (protrusion portion) is smaller than that of a lower-side bottom 6, wherein the lengths (i, j) of diagonal lines of the lower-side bottom 6 are: i=0.8 mm and j=1.0 mm.

On the upper-side bottom 5 of the each protrusion 3, a rhomboid-shaped opening portion 8 punched in the direction from the upper-side bottom 5 to the lower-side bottom 6 in a plan view. In more detail, the opening portion 8 is formed of a small concave portion 9, which is concavely formed in a central portion of the upper-side bottom 5, and a cross-throwing-knife shaped (or, sharp-cross shaped) opening 10 punched toward the lower-side bottom 6 in a central portion of the small concave portion 9. The small concave portion 9 is formed into a petal-like shape spreading with four petal-shaped pieces. In this embodiment, the lengths of the diagonal lines (k and m) of the opening portion 8, that is, the diagonal-line lengths (k and m) of the small concave portion 9 are: k=0.4 mm and m=0.6 mm. The thickness d of the metallic porous body 1 is 0.44 mm. The height e of a punched portion, which is defined by a flat portion of the upper-side bottom 5 and a lower end portion of the burr 7, is 0.24 mm, and e/d is 0.55. The weight of the metal body 2 after formation of the protrusions is 215 g/m².

In addition to the above, in the present embodiment, attention is called to the fact that the extension direction of one of the two diagonal lines (i and j) individually connecting between mutually opposing apexes of the rhomboid of the protrusion 3 conforms to the direction of the long side of the metallic porous body 1. FIG. 7 shows a pattern wherein the extension direction of the diagonal line j conforms to the direction of the long side of the metallic porous body 1.

Thus, the arrangement is made such that one of the diagonal lines of the rhomboid-shaped protrusion 3 conforms to the direction of the long side of the metallic porous body 1, that is, the direction of feeding the metal body 2, which is the base material, to an opposing gap S between embossing rollers 12a and 12b. Thereby, the extension directions of the individual sides constituting the rhomboid-shaped protrusion 3 is caused not to conform to the direction of feeding the metal body 2 into the opposing gap S between the embossing rollers 12a and 12b. As such, compared with the case in which, as shown in FIG. 2, the extension directions of the individual sides constituting the rectangle-shaped protrusion 3 conform to the direction of feeding the metal body 2 to the embossing rollers 12a and 12b, a force exerting on the metal sheet 2 during the press forming to elongate the metal sheet 2 to the direction of the long side thereof is dispersed, thereby enabling the force to be reduced as low as possible. Consequently, the metal sheet 2 can be prevented from being unintentionally elongated in the direction of the long side, and hence the metallic porous body 1 can be fabricated with high dimensional accuracy. Concurrently, for example, the metallic porous body 1 can be effectively prevented from wrinkling, and the metallic porous body 1 can be effectively prevented from being cleaved because of the opening portions 8 being enlarged.

As shown in FIG. 4, the base material 1 having the three-dimensional body described above can be fabricated by feeding the metal sheet 2 to pass through an opposing gap S between the pair of upper and lower embossing rollers 12a and 12b that rotate in directions opposite to each other. In this case, as shown in FIG. 8A, on the surface of each of the embossing rollers 12a and 12b, large numbers of convex portions 14 and concave portions 15 are formed alternately with one another in the longitudinal and lateral directions in a matrix. As shown in FIG. 8B, each of the convex portions 14 is convexly formed into the rhombic-truncated-pyramidal shape so as to downwardly spread; and a rhombic-pyramidal fine concave portion 17 is concavely formed in a central portion of the convex portion. Each of the concave portions 15 is concavely formed into the rhombic-truncated-pyramidal shape to upwardly spread; and in a central portion of a cave-in portion 21 thereof, there is formed a cross-throwing-knife shaped fine convex portion 18 having four apexes formed toward corner portions of the concave portion 15 in a plan view. A ridge portion connecting between each of the apexes of the fine convex portion 8 and a protrusion apex portion in the center is formed in the form of a cutting edge. The convex and concave portions 14 and 15 are each formed such that the extension direction of one of the two diagonal lines individually connecting between the mutually opposing apexes of the rhomboid of each of the convex and concave portions 14 and 15 conforms to the direction of the long side of the metal sheet 2, that is, the direction of feeding the metal sheet 2 to the embossing rollers 12a and 12b.

As shown in FIG. 6, the convex and concave portions 14 and 15 and fine concave and convex portions 17 and 18 of the upper and lower embossing rollers 12a and 12b are provided to be alternate with one another. In more specific, the concave portion 15 of the lower roller 12b is positioned in a position matching the convex portion 14 of the upper roller 12a; and likewise, the fine concave portion 17 of the lower roller 12b is positioned in a position matching the fine convex portion 18 of the upper roller 12a. Thus, the opposing gap S between the upper and lower embossing rollers 12a and 12b is provided to have a wavy teeth profile in which the upper and lower convex and concave portions 14 and 15 can be engaged with the fine concave and convex portions 17 and 18.

As shown in FIG. 4, when the metal sheet 2 is fed into the opposing gap S of the embossing rollers 12a and 12b, the rhombic-truncated-pyramidal protrusions 3 are formed on the obverse and reverse surfaces of the metal sheet 2, as shown in FIG. 7. At this time, the protrusions 3 are each formed such that the extension direction of one of the two diagonal lines individually connecting between the mutually opposing apexes of the rhomboid conforms to the direction of the long side of the metal sheet 2.

(Third Embodiment)

FIG. 9 shows a metallic porous body according to a third embodiment. As shown in FIGS. 1 and 7, a metallic porous body 1 is fabricated by press-forming a metal sheet 2 made of an original material such as iron, stainless steel, nickel, copper, or aluminium. On obverse and reverse sides of the metal 2, a large number of equilateral-triangular-truncated-pyramidal protrusions 3 are formed in such a manner as to alternately protrude in a matrix. The protrusions 3 are each formed into an rhombic-truncated-pyramidal shape so that the area of an upper-side bottom 5 (protrusion portion) is smaller than that of a lower-side bottom 6, wherein the length (o) of one side of the lower-side bottom 6 is 1.2 mm.

On the upper-side bottom 5 of the each protrusion 3, a triangle-shaped opening portion 8 punched in the direction from the upper-side bottom 5 to the lower-side bottom 6 in a plan view. The opening portion 8 is formed of a small concave portion 9, which is concavely formed in a central portion of the upper-side bottom 5, and a throwing-knife shaped (or, sharp-Y shaped) opening 10 having tri-directional cuts and punched toward the lower-side bottom 6 in a central portion of the small concave portion 9. The small concave portion 9 is formed into a petal-like shape spreading with three petal-shaped pieces. In this embodiment, a length n of one side of the small concave portion 9 is 0.85 mm. As shown in FIG. 1, the thickness d of the metallic porous body 1 is 0.44 mm. In addition, the height e of a punched portion, which is defined by a flat portion of the upper-side bottom 5 and a lower end portion of the burr 7, is 0.24 mm, and e/d is 0.55. The weight of the metal body 2 after formation of the protrusions is 215 g/m$^2$.

Thus, the arrangement is made such that the each protrusion 3 is formed into the triangular-truncated-pyramidal shape, the extension direction of one side (the extension direction of a side n, in FIG. 9) of the triangle of the protrusion 3 conforms to the direction of the long side of the metal sheet 2 (metallic porous body 1), that is, the direction of feeding the metal body 2, which is the base material, to an opposing gap S between embossing rollers 12a and 12b. Accordingly, similar to the FIG. 7 case according to the above-described second embodiment, a force exerting on the metal sheet 2 during the press forming to elongate the metal sheet 2 to the direction of the long side thereof is dispersed, so that the force can be reduced as low as possible. Consequently, the metal sheet 2 can be prevented from being unintentionally elongated in the direction of the long side, and hence the metallic porous body 1 can be fabricated with high dimensional accuracy. Concurrently, for example, the metallic porous body 1 can be effectively prevented from wrinkling, and the metallic porous body 1 can be effectively prevented from being cleaved because of the opening portions 8 being enlarged.

As shown in FIG. 4, the base material 1 having the three-dimensional body described above can be fabricated by feeding the metal sheet 2 to pass through an opposing gap S between the pair of upper and lower embossing rollers 12a and 12b that rotate in directions opposite to each other. In this case, as shown in FIG. 10A, on the surface of each of the embossing rollers 12a and 12b, large numbers of convex portions 14 and concave portions 15 are formed alternately with one another in the longitudinal and lateral directions. As shown in FIG. 10B, each of the convex portions 14 is convexly formed into the triangular-truncated-pyramidal shape so as to downwardly spread; and a triangular-pyramidal fine concave portion 17 is concavely formed in a central portion of the convex portion. Each of the concave portions 15 is concavely formed into the triangular-truncated-pyramidal shape to upwardly spread; and in a central portion of a cave-in portion 21 thereof, there is formed a throwing-knife shaped fine convex portion 18 having three apexes formed toward corner portions of the concave portion 15 in a plan view. A ridge portion connecting between each of the apexes of the fine convex portion 8 and a protrusion apex portion in the center is formed in the form of a cutting edge. In the present case, the convex and concave portions 14 and 15 are each formed such that one of extension directions of one side of the triangle of each of the convex and concave portions 14 and 15 conforms to the direction of the long side of the metal sheet 2, that is, the direction of feeding the metal sheet 2 to the embossing rollers 12a and 12b.

As shown in FIG. 6, the convex and concave portions 14 and 15 and fine concave and convex portions 17 and 18 of the upper and lower embossing rollers 12a and 12b are provided to be alternate with one another. In more specific, the concave portion 15 of the lower roller 12b is positioned in a position matching the convex portion 14 of the upper roller 12a; and likewise, the fine concave portion 17 of the lower roller 12b is positioned in a position matching the fine convex portion 18 of the upper roller 12a. Thus, the opposing gap S between the upper and lower embossing rollers 12a and 12b is provided to have a wavy teeth profile in which the upper and lower convex and concave portions 14 and 15 can be engaged with the fine concave and convex portions 17 and 18.

As shown in FIG. 4, when the metal sheet 2 is fed into the opposing gap S of the embossing rollers 12a and 12b, the equilateral-triangular-truncated-pyramidal protrusions 3 protruding alternately with each other are formed on the obverse and reverse surfaces of the metal sheet 2, as shown in FIG. 9. At this time, the protrusions 3 are each formed to have such a posture as that the extension direction of the one side (the extension direction of the side n, in FIG. 9) of the triangle of the protrusion 3 conforms to the direction of the long side of the metal body 2 (metallic porous body 1).

Table 1 shows elongation percentages in the direction of the long side of the metallic porous bodies 1 of the individual embodiments 1 to 3. In more specific, the each metallic porous body 1 was obtained in the manner that, as shown in FIG. 4, a metal body 2 having a width (short side) of 90 mm and a length (long side) of 800 mm is inserted between the embossing rollers 12a and 12b in the direction of the long side, is compress-processed to an overall thickness of 0.28 mm.

TABLE 1

|  | Elongation percentage |
| --- | --- |
| First Embodiment | 2.7% |
| Second Embodiment | 1.4% |
| Third Embodiment | 0.5% |

From Table 1, it can be known that, as in the first embodiment, when the extension directions of the individual sides constituting the rectangle-shaped convex portion 3 conform to the direction of feeding the metal body 2 to the embossing rollers 12a and 12b, the elongation percentage in the direction of the long side of the metal body 2 is higher than those of the second and third embodiments, and it is therefore difficult to form the metallic porous body 1 with high accuracy.

In comparison to the first above, however, it can be known that the elongation percentage is low and the metallic porous body 1 can be fabricated with high accuracy as in the case of the second embodiment where the extension direction of one of the two diagonal lines i and j (the extension direction of the diagonal line j, in FIG. 7) individually connecting between the mutually opposing apexes of the rhomboid of the rhombic-truncated-pyramidal protrusion 3 conforms to the direction of the long side of the metal sheet 2 (metallic porous body 1), that is, the direction of feeding the metal body 2, which is the base material, to the embossing rollers 12a and 12b, and as in the case of the third embodiment where the extension direction of one side (the extension direction of the side n, in FIG. 9) of the triangle of the triangular-truncated-pyramidal protrusion 3 conforms to the direction of the long side of the metal sheet 2 (metallic porous body 1), that is, the direction of feeding the metal body 2, which is the base material, to the opposing gap S between the embossing rollers 12a and 12b.

While the embodiments described above each have the protrusions 3 each having the shape such as the rectangular-truncated-pyramidal shape or triangular-truncated-pyramidal shape, the shape of the protrusion 3 or the opening portion 8, for example, is not limited to that shape. The shape may be a polygonal shape, such as a pentagonal shape or hexagonal shape.

The metallic porous body of the present invention is a porous base material having a large number of independent fine pores, so that it can be used with various filters such as air filters and oil mist filters. In addition, the porous body can be used for a carrier of industrial deodorizing catalyst.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A metallic porous body comprising:
a number of protrusions formed on obverse and reverse sides of a metal sheet so as to protrude alternately with one another; each of the protrusions being formed into an angular-truncated-pyramidal shape so that an area of an upper-side bottom thereof is smaller than an area of lower-side bottom thereof;
wherein an opening portion having a shape as a polygon in a plan view and punched out in the direction from the upper-side bottom to the lower-side bottom is formed in the upper-side bottom of each protrusion, and
a vertical distance (d) between the upper-side bottom on the obverse side and the upper-side bottom on the reverse side, and a height (e) of a punched portion have a relation: $0.3 < e/d < 0.9$.

2. A metallic porous body having a large number of independent opening portions comprising:
a number of protrusions formed on obverse and reverse sides of a metal sheet so as to protrude alternately with one another; each of the protrusions being formed into a rhombic-truncated-pyramidal shape so that an area of an upper-side bottom thereof is smaller than an area of lower-side bottom thereof;
wherein an opening portion having a shape as a rhomboid in a plan view and punched in the direction from the upper-side bottom to the lower-side bottom is formed in the upper-side bottom of each protrusion,
the opening portion includes a rhombic-pyramidal small concave portion which is concavely formed in a central portion of the upper-side bottom, and a cross-throwing-knife shaped opening directed to four corner portions of the upper-side bottom in a central portion of the small concave portion, the small concave portion being formed into a petal-like shape downwardly spreading with four petal-shaped pieces, and
an extension direction of one of two diagonal lines individually connecting between mutually opposing apexes of the rhomboid of the protrusion conforms to the direction of the long side of the metallic porous body.

3. A metallic porous body having a large number of independent opening portions comprising:
a number of protrusions formed on obverse and reverse sides of a metal sheet so as to protrude alternately with one another; each of the protrusions being formed into a triangular-truncated-pyramidal shape so that an area of an upper-side bottom thereof is smaller than an area of lower-side bottom thereof;
wherein an opening portion having a shape as a triangle in a plan view and punched in the direction from the upper-side bottom to the lower-side bottom is formed in the upper-side bottom of each protrusion,
the opening portion includes a triangular-pyramidal small concave portion which is concavely formed in a central portion of the upper-side bottom, and a triangular-throwing-knife shaped opening directed to three corner portions of the upper-side bottom in a central portion of the small concave portion, the small concave portion being formed into a petal-like shape downwardly spreading with three petal-shaped pieces, and
an extension direction of one side of the triangle of the protrusion conforms to the direction of the long side of the metallic porous body.

4. The metallic porous body according to claim 2, wherein a vertical distance (d) between the upper-side bottom on the obverse side and the upper-side bottom on the reverse side, and a height (e) of a punched petal portion have a relation: $0.3 < e/d < 0.9$.

5. The metallic porous body according to claim 3, wherein a vertical distance (d) between the upper-side bottom on the obverse side and the upper-side bottom on the reverse side, and a height (e) of a punched petal portion have a relation: $0.3 < e/d < 0.9$.

6. The metallic porous body according to claim 1, wherein a thickness of the metal sheet is ranged from 10 to 50 $\mu$m.

7. The metallic porous body according to claim 2, wherein a thickness of the metal sheet is ranged from 10 to 50 μm.

8. The metallic porous body according to claim 3, wherein a thickness of the metal sheet is ranged from 10 to 50 μm.

9. The metallic porous body according to claim 1, wherein a thickness of the metallic porous body including the protrusions is ranged from 0.06 to 1.2 mm.

10. The metallic porous body according to claim 2, wherein a thickness of the metallic porous body including the protrusions is ranged from 0.06 to 1.2 mm.

11. The metallic porous body according to claim 3, wherein a thickness of the metallic porous body including the protrusions is ranged from 0.06 to 1.2 mm.

12. The metallic porous body according to claim 1, wherein the metal sheet has a unit weight ranged from 50 to 450 g/m$^2$.

13. The metallic porous body according to claim 2, wherein the metal sheet has a unit weight ranged from 50 to 450 g/m$^2$.

14. The metallic porous body according to claim 3, wherein the metal sheet has a unit weight ranged from 50 to 450 g/m$^2$.

15. The metallic porous body according to claim 1, wherein an angle between a portion punched downwardly of the protrusion and a flat portion of the upper-side bottom is greater than 0° and smaller than 90°.

16. The metallic porous body according to claim 2, wherein an angle between a portion punched downwardly of the protrusion and a flat portion of the upper-side bottom is greater than 0° and smaller than 90°.

17. The metallic porous body according to claim 3, wherein an angle between a portion punched downwardly of the protrusion and a flat portion of the upper-side bottom is greater than 0° and smaller than 90°.

18. The metallic porous body according to claim 1, wherein the metallic porous body is pressed by feeding a rectangle-shaped planar metal sheet having short sides and long sides along the direction of the long side into an opposing gap of a pair of embossing rollers.

19. The metallic porous body according to claim 2, wherein the metallic porous body is pressed by feeding a rectangle-shaped planar metal sheet having short sides and long sides along the direction of the long side into an opposing gap of a pair of embossing rollers.

20. The metallic porous body according to claim 3, wherein the metallic porous body is pressed by feeding a rectangle-shaped planar metal sheet having short sides and long sides along the direction of the long side into an opposing gap of a pair of embossing rollers.

* * * * *